(12) United States Patent
Strobl

(10) Patent No.: US 6,416,180 B1
(45) Date of Patent: Jul. 9, 2002

(54) PROJECTION LAMP FOR THE PROJECTION OF COLORED LIGHT EFFECTS

(75) Inventor: Matthias Strobl, Bielefeld (DE)

(73) Assignee: Luxtech Limited, Dublin (IE)

(*) Notice: Subject to any disclaimer, the term of this patent is extended or adjusted under 35 U.S.C. 154(b) by 0 days.

(21) Appl. No.: 09/647,510

(22) PCT Filed: Jan. 31, 2000

(86) PCT No.: PCT/EP00/00767

§ 371 (c)(1),
(2), (4) Date: Nov. 27, 2000

(87) PCT Pub. No.: WO00/45219

PCT Pub. Date: Aug. 3, 2000

(30) Foreign Application Priority Data

Jan. 29, 1999 (DE) .................................. 299 01 468 U
Dec. 8, 1999 (DE) .................................. 199 59 149

(51) Int. Cl.⁷ .................... G03B 21/00; G09F 13/24
(52) U.S. Cl. .................... 353/2; 362/101; 362/318; 353/98
(58) Field of Search ................ 353/2, 1, 84, 98; 362/101, 135, 293, 296, 318; 40/406, 407

(56) References Cited

U.S. PATENT DOCUMENTS

| 1,795,128 A | | 3/1931 | Hönig ................ 40/407 |
| 2,075,696 A | * | 3/1937 | Boerstler ........ 362/318 X |
| 3,185,829 A | * | 5/1965 | Rau .............. 362/101 X |
| 3,843,244 A | * | 10/1974 | Facchini ............ 353/2 |
| 4,742,439 A | * | 5/1988 | Choate ............ 353/2 X |
| 5,683,174 A | * | 11/1997 | Lena, Jr. ........... 362/318 |
| 6,135,604 A | * | 10/2000 | Lin .................. 362/101 |

FOREIGN PATENT DOCUMENTS

| FR | 2571153 | 4/1986 | ........... G02B/5/06 |
| JP | 08095510 | 4/1996 | ........... G09F/13/24 |
| JP | 10133610 | 5/1998 | ........... G09F/19/02 |

* cited by examiner

Primary Examiner—W. B. Perkey
(74) Attorney, Agent, or Firm—Richard M. Goldberg

(57) ABSTRACT

A projection lamp (10) for the projection of colored light effects includes a light source (18) and a transparent container (12) which is arranged in the beam path of the light source (18) and which is filled with an emulsion (26) of differently colored emulsion components (28,30), the container (12) being configured as an open, arched dish, the light source (18) being arranged below or above the dish (12) in order to project the dish content on a projection area, and the projection lamp further includes an exciter (40) for stirring and mixing the emulsion (26).

11 Claims, 1 Drawing Sheet

PROJECTION LAMP FOR THE PROJECTION OF COLORED LIGHT EFFECTS

BACKGROUND OF THE INTENTION

The present invention relates to a projection lamp for projecting colored light effects.

Projection lamps of this type are used as decoration in the residential sector or also in discos or the like. Colored light patterns, constantly changing in an unpredictable manner, can be projected with the lamps onto an area of the room. These colored patterns are produced by an emulsion, which is filled into a transparent container, which is disposed in the beam path of the light source of the projection lamp. The emulsion comprises at least two differently colored emulsion components, such as water and oil, which do not form a chemical compound with one another, so that the components are constantly separated from one another by a boundary surface.

Light projections are also used, for example, in color therapy. The choice of colors and the configuration of the patterns produced are of decisive importance here. It should therefore be possible to change the colors and patterns of the projection. Because they can be handled better, the containers of known lamps are closed so that, for changing the color combination, the container must be exchanged completely. Moreover, in the case of the known projection lamps, it is not possible to influence the movement of the emulsion and the flow and merging of the oil drops in the water. Furthermore, the appearance of the colored pattern depends on the proportion by volume of the emulsion components, which can also not be changed, since the closed containers are not designed for replenishing liquid. Finally, it may be desirable to add solid particles, small objects or the like, which also cause light effects, to the emulsion.

SUMMARY OF THE INVENTION

It is therefore an object of the invention to provide a projection lamp of the type named above, the light effects of which can be affected in a simple manner by the user.

The transparent container of the inventive projection lamp is constructed as an open arched dish, into which the emulsion is filled. In this case, the light source is disposed in such a manner above or below the dish, that the light passes through the emulsion and produces a projection of the contents of the dish on a projection surface. It is particularly appropriate to mount the light source below the dish and project the contents of the dish onto the ceiling of the room. Due to the arched shape of the dish and the plane liquid surface of the emulsion, the dish forms a planar convex lens, which produces an image of the schlieren of the emulsion. It is furthermore conceivable to have the light fall at an angle from above onto the liquid surface, so that it is partially reflected at the bottom of the dish and emerges at an angle upwards from the dish. In the case of this arrangement, the light is projected onto a surface which, in relation to the dish, lies essentially opposite to the light source.

To produce the constantly changing light effects, the emulsion is kept moving by an exciter, which can be controlled by the user of the projection lamp. Advisably, this exciter is mounted at the edge of the dish and dips into the emulsion or, at the very least, contacts the surface of the liquid.

In particular, the user has the possibility of exchanging the emulsion in the dish completely for a different emulsion with different colors, of replenishing liquid components or of adding particles or objects which, in turn, cause light effects.

Pursuant to the invention, the exciter may be a stirrer or a vibration generator, especially an ultrasonic generator. For example, it is possible to cause the edge of the dish itself to oscillate, the oscillations being transferred to the liquid.

In a further embodiment, the exciter is a blower, which blows air bubbles into the emulsion or causes the liquid to move slightly.

Preferably, the projection lamp is provided with a filling device for automatically filling or replenishing emulsion components. For example, during the operation of the light, the dish can be replenished dropwise or by a slight inflow of oil from a tank, so that the light effects are changed. The inflow advisably can be controlled by the user.

BRIEF DESCRIPTION OF THE DRAWING

For changing the projection properties of the lamp, the distance of the light source from the dish is variable in one embodiment of the invention. Pursuant to a further embodiment, a color filter is disposed between the light source and the dish and, together with the colors of the emulsion components, produces mixed colors in the projection image.

DETAILED DESCRIPTION

Figure 1:
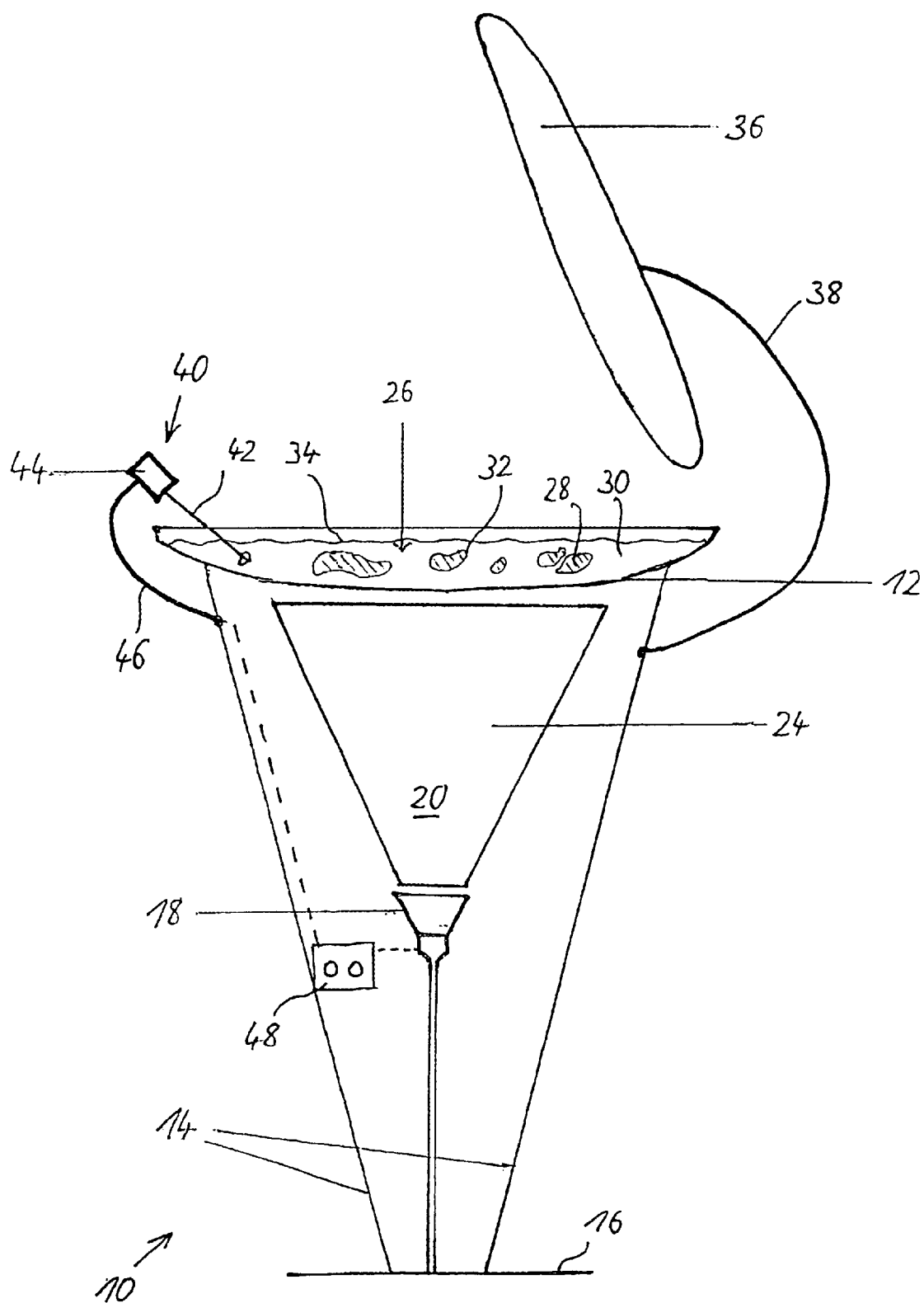

In a further preferred embodiment, a correcting lens, such as a Fresnel lens, is disposed in the beam path of the projection, that is, above or below the dish depending on where the light source is disposed. The height of the correcting lens can be adjusted in order to adjust the sharpness of the projected image.

The light need not necessarily be projected onto the ceiling of the room. Instead, by mounting the light source above the dish, the light can also be projected onto the floor. In a preferred embodiment, there is an inclined mirror on the side of the dish opposite the light source. Said mirror deflects the projection direction sideways, so that the image can be projected sideways onto the wall of a room or onto a projection screen. Advantageously, the angle of inclination of the mirror in this case is about 45°.

In a further inventive embodiment, a semitransparent projection screen, such as an opalescent glass disk, is disposed in the beam path of the projection. If the image, for example, is projected from below onto the projection screen, it can be viewed on the opposite upper side. This embodiment is useful particularly as a table construction, the projection screen being integrated into the table top and the remaining components of the projection lamp being disposed below the table top. In this case, for example, the viewer can be seated at the table and view the projected image.

In the following, a preferred embodiment of the invention is described in greater detail by means of the drawing.

The single FIG. shows a diagrammatic side view of the inventive projection lamp.

The inventive projection lamp 10 in FIG. 1 comprises a flat curved dish 12, which lies on the upper edge of a holder 14. The holder 14, at its underside, has a flat foot 16 for setting up on the floor of a room, a table or the like. Within the holder 14, a light source 18 is disposed below the dish 12. The light source 18 essentially is a radiator, the ray beam 20 of which is directed upward, so that it transilluminates the transparent dish 12. The light source 18 is connected to the power supply, which is not shown, by an electrical lead 22.

So that no scattered light can emerge from the light source 18 laterally from the projection lamp 10, the cone of light 20 of the light source 18 is shielded by a cone-shaped screen 24.

The dish 12 is filled with an emulsion 26 of water 28 and oil 30. Since the water 28 and the oil 30 do not form a chemical compound with one another, the two components 28, 30 of the emulsion are constantly separated by boundary layers which, in FIG. 1, for example, are labeled 32. The water 28 and the oil 30 are dyed with different dyes, for example, with a yellow dye and a red dye. The emulsion 26 is transilluminated by the ray beam 24 of the light source 18. Due to the plane liquid surface 34 of the emulsion 26 and the curved underside of the dish 12, the emulsion 26 forms a planar convex lens, by means of which the contents of the dish can be imaged on a plane above the dish 12.

In this way, it is possible to image the contents of the dish 12, for example, on the ceiling of a room, which is not shown. In the embodiment, shown in FIG. 1, the projection lamp 10 is provided with a mirror 36, which is mounted at the holder 14, so that it can be adjusted by a flexible arm 38, and is disposed above the dish 12 at an inclination of about 45°, so that the projection can be diverted and the image is projected laterally, that is, to the left in FIG. 1, onto the wall of a room or onto a vertical projection screen.

At the edge of the dish 12, an exciter 40 is mounted, which sets the emulsion 26 into motion and ensures the constant mixing of the emulsion components 28, 30 and the movement of the boundary surfaces 32. The exciter is a stirrer with a shaft 42, which is driven by a motor 44 and, with its free end, dips into the emulsion 26. The housing of the motor 44 is connected by an arm 46 with the holder 14 of the projection lamp 10. Power is supplied to the motor 44 by a lead extending within the arm 46. Furthermore, the projection lamp 10 is provided with a control device 48, by means of which the user can control the intensity of the light source 18 and the rotational speed of the motor 44.

In an equivalent manner, the projection device can be reversed in that the light source 18, in a manner not shown, is mounted above the dish 12, so that its cone of light 24 is directed downward, whereas the mirror 36, for the lateral deflection of the projection, in this case is provided below the dish 12.

What is claimed is:

1. A projection lamp for projecting colored light effects, comprising:

a light source, a transparent container, disposed in a beam path of the light source and filled with an emulsion with differently colored emulsion components, the container being constructed as an open arched dish, the light source for projecting the contents of the dish onto a projection surface being disposed one of:
   a) above and
   b) below the dish, and an exciter for moving and mixing the emulsion.

2. The projection lamp of claim 1, wherein the exciter includes a stirrer.

3. The projection lamp of claim 1, wherein the exciter includes a vibration generator.

4. The projection lamp of claim 3, wherein the exciter includes an ultrasonic generator.

5. The projection lamp of claim 1, wherein the exciter includes a blower.

6. The projection lamp of claim 1, further comprising a filling device for automatically filling at least one of the emulsion components into the dish.

7. The projection lamp of claim 1, wherein the distance of the light source from the dish is variable.

8. The projection lamp of claim 1, further comprising a color filter disposed between the light source and the dish.

9. The projection lamp of claim 1, further comprising a correcting lens disposed adjustably in the beam path of a projection from the light source.

10. The projection lamp of claim 1, further comprising a mirror for deflecting the direction of a projection from the light source, disposed in an inclined manner on a side of the dish opposite the light source.

11. The projection lamp of claim 1, further comprising a semitransparent projection screen disposed in the beam path that is projected.

\* \* \* \* \*